Oct. 23, 1934.  A. BAJ  1,977,752
INTERNAL COMBUSTION ENGINE
Filed Sept. 27, 1932   2 Sheets-Sheet 1
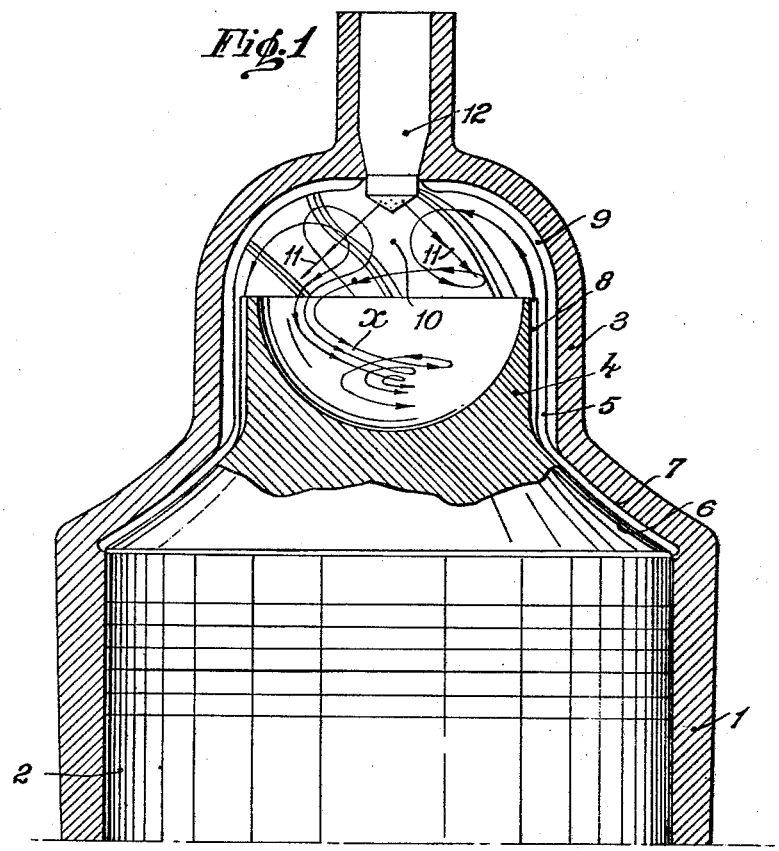
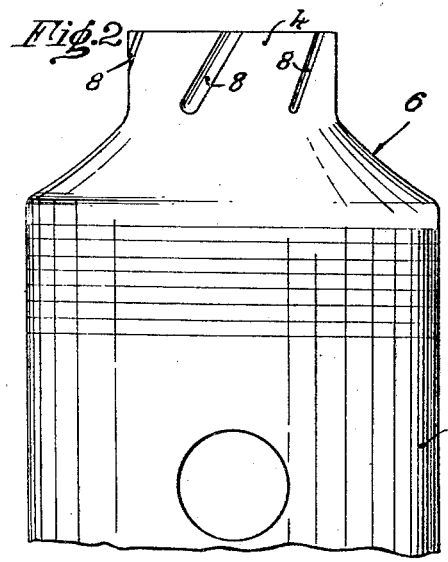
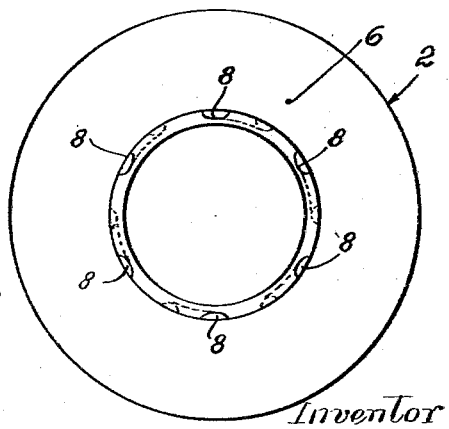
Inventor:
Alessandro Baj
by
Morrison, Kennedy & Campbell
Attorneys.

Oct. 23, 1934.   A. BAJ   1,977,752
INTERNAL COMBUSTION ENGINE
Filed Sept. 27, 1932   2 Sheets-Sheet 2

Inventor:
Alessandro Baj
by
Morrison, Kennedy & Campbell
Attorneys.

Patented Oct. 23, 1934

1,977,752

UNITED STATES PATENT OFFICE 1,977,752

INTERNAL COMBUSTION ENGINE

Alessandro Baj, Milan, Italy

Application September 27, 1932, Serial No. 635,026
In Italy October 1, 1931

3 Claims. (Cl. 123—32)

The present invention relates to internal combustion engines, and has for its subject matter a means for improving the combustion therein.

The invention aims at quickening, in fuel injection engines, the combustion following the compression phase by bringing about the injection of fuel into a mass of air endowed with such motion as to bring about continuous movement and an exchange of the air surrounding the injected fuel particles, thus causing mutual impingement, entrainment and effective distribution in a manner best suited for rapid and complete admixture and combustion.

The action according to the invention consists in imparting to the air, at the end of the compression phase, an eddying or turbulent motion with substantially helicoidal trajectories.

The device for carrying out said action is essentially distinguished by the fact that at least one of the piston or cylinder surfaces is provided with air guiding means, preferably in the form of grooves, of character to impart a turbulent helicoidal motion to the air.

The invention will now be described with reference to the accompanying drawings which illustrate, only by way of example, an embodiment of the principles thereof.

Fig. 1 is a diagrammatic longitudinal part sectional elevation of an internal combustion cylinder head and piston constructed according to the invention.

Figs. 2 and 3 respectively show in longitudinal elevation and plan the piston constructed according to the invention.

Figure 5:
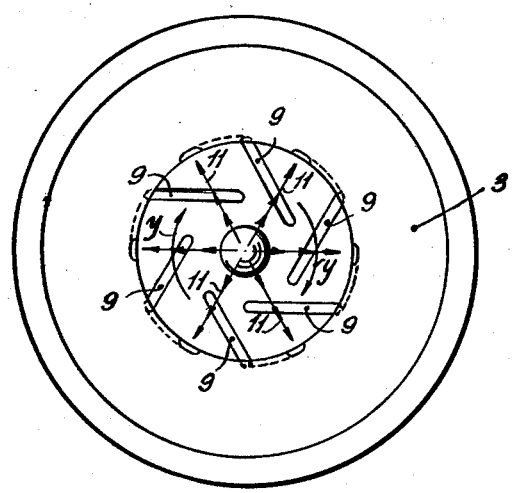
Figure 4:
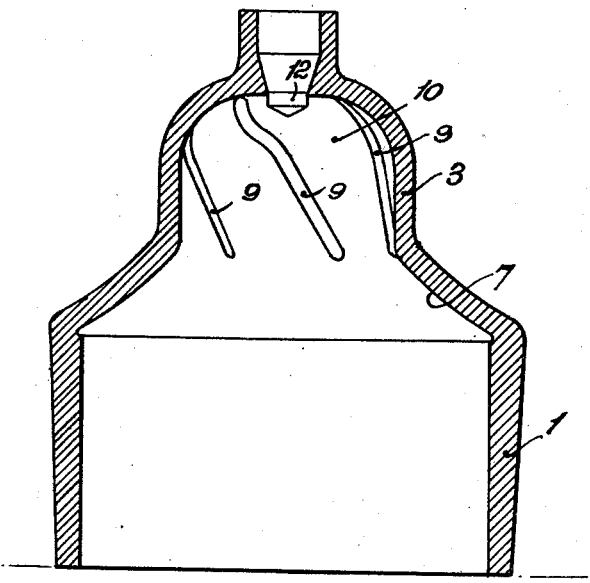

Figs. 4 and 5 respectively show in longitudinal section and inverted plan the cylinder constructed according to the invention.

The cylinder 1 and piston 2 have at their cylinder head end the reduced portions 3 and 4 respectively, the restricted portions differing in diameter in order to form a clearance space 5 between the two. The said reduced portions are connected by the surfaces 6 and 7 respectively to the body parts of the cylinder and piston which have a gas tight fit.

According to the invention, the reduced terminal part of the piston is formed with grooves 8 inclined relatively to the piston axis and, in the example shown, also the inner surface of the reduced cylinder head is fitted with grooves 9 that are correspondingly inclined.

The said grooves are helicoidal, or inclined substantially like a helix.

From the moment, at the end of the stroke, that the two cylindrical surfaces 3 and 4 of reduced diameter begin to move over one another, the space comprised between the converging parts 6 and 7 diminishes in size and the air is forced into the combustion chamber 10 with a turbulent motion as indicated by the lines $x$ in Fig. 1 and by the arrows $y$ in Fig. 5. As a consequence the air streams $x$, $y$, impinge upon the fuel jets 11 issuing from the spray nozzle 12, at a substantial angle for example transversely, so that the fuel particles are entrained in the eddying motion and thus quickly and thoroughly mix with the air particles and are distributed in a manner that will secure an efficient and quick combustion.

By suitably proportioning the two smaller diameter cylindrical surfaces 3 and 4 to the compression brought about by the volume diminution of the space comprised between the surfaces 6 and 7, variable or constant velocities can be imparted, during the final part of the compression, to the air entering the combustion chamber, such as will ensure the desired degree of turbulence.

The guiding and directing ducts may be in the shape of grooves or may be in the form of ribs. When such means are present not only in the piston but also in the cylinder head, they may extend to the closed upper part so as to maintain the air in its turbulent motion.

It is obvious that the air guiding and directing means may be present either on the piston end or on the inner surface of the cylinder head or, as shown, on both cooperatively.

By suitably proportioning the number, diameter, length and inclination of the ducts, and the volume of the chamber, and by adopting for this chamber the shape best suited for the various cases, it is practicable to impart to the air jets the velocity and inclination that are best suited to secure the optimum turbulence.

Of course the invention is not confined to the engine types mentioned, but is applicable also to other types inclusive of explosion engines.

The constructional details of the described embodiments of the invention may be varied in practice without exceeding the limits of the invention as defined by the following claims.

Having now described my invention and how the same is to be carried out, what I claim as my invention is:

1. An internal combustion or explosion engine having the piston slidable up and down in the cylinder, the upper portion of the piston being of substantially reduced diameter and with a shoulder between its body and reduced end, the upper portion of the cylinder being correspondingly reduced in diameter but with a clearance passage between its reduced portion and the piston, whereby the air space above the piston shoulder may deliver through such clearance into the combustion chamber between the cylinder end and piston end, the cylinder end being arched above the piston and the piston top being concaved thereby to form a rounded or spherical combustion chamber, means injecting fuel through the cylinder end into the combustion chamber near the end of the compression stroke, and inclined ribs or grooves on the reduced portions of the cylinder or piston, whereby air being forced from said space into the chamber during the compression stroke receives whirling motion during fuel injection.

2. An internal combustion or explosion engine having the piston slidable up and down in the cylinder, the upper portion of the piston being of substantially reduced cylindrical diameter and with a shoulder between its body and reduced end, the upper portion of the cylinder being correspondingly reduced in cylindrical diameter but with a clearance passage between its reduced portion and that of the piston, whereby the air space above the piston shoulder may deliver through such clearance into the combustion chamber enclosed between the cylinder end and piston end, the cylinder end being arched above the piston and the piston top being deeply concaved thereby to form an enlarged combustion chamber, means injecting fuel into the combustion chamber near the end of the compression stroke, and inclined ribs or grooves on the reduced portions of the cylinder or piston, whereby air being forced from said space into the chamber during the compression stroke imparts helicoidal motion to the air in the combustion chamber during fuel injection.

3. An engine as in claim 2 and wherein the cylinder top end is highly arched and the piston top is deeply curvedly depressed to form an approximately spherical combustion chamber.

ALESSANDRO BAJ.